E. K. HAYNES.
Lanterns.

No. 144,200. Patented Nov. 4, 1873.

Witnesses.
Newton Crawford
S. Mason Goszler

Inventor.
Edgar K. Haynes
by Wm Colborne Brookes
his attorneys

UNITED STATES PATENT OFFICE.

EDGAR K. HAYNES, OF BOSTON, MASSACHUSETTS.

IMPROVEMENT IN LANTERNS.

Specification forming part of Letters Patent No. 144,200, dated November 4, 1873; application filed October 9, 1873.

*To all whom it may concern:*

Be it known that I, EDGAR K. HAYNES, of the city of Boston, in the county of Suffolk and State of Massachusetts, have invented certain new and useful Improvements in Lanterns and Lamps; and I do hereby declare the following to be a full, clear, and exact description of the invention, such as will enable others skilled in the art to which it pertains to make and use it, reference being had to the accompanying drawings which form part of this specification.

My invention relates to improvements on lanterns for burning hydrocarbon oils; and consists in improvements on an invention for which Letters Patent of the United States were granted to me bearing date March 18, 1873, No. 136,994, and the object of my invention is to render such lanterns thoroughly portable and to prevent the flame of the lamp from being extinguished by currents of air under any circumstances or conditions of the weather, and to allow free passage for any water accumulating in the lantern away therefrom.

Figure 3:
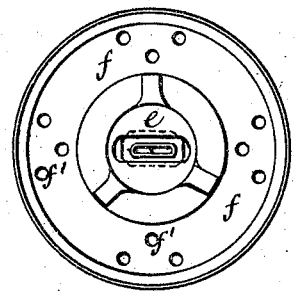
Figure 4:
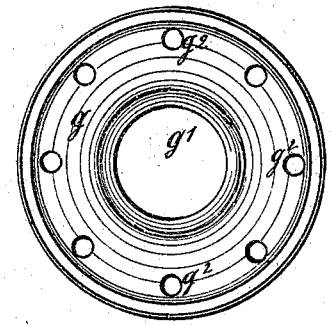
Figure 1:
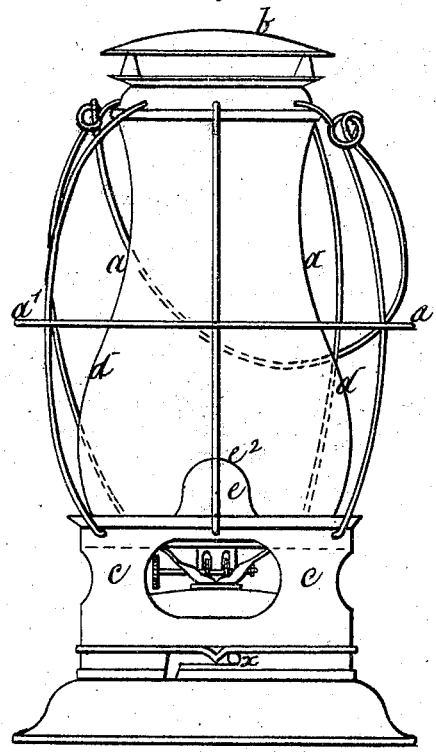
Figure 2:
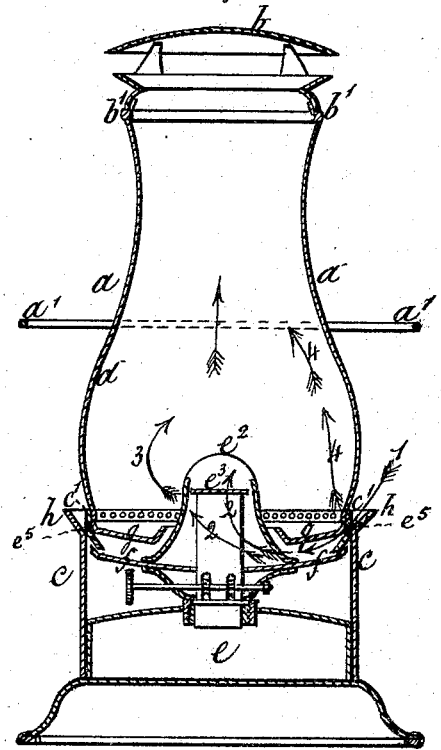

In the accompanying drawings, Figure 1 represents an external view, Fig. 2 a section, and Figs. 3 and 4 details views, of a lantern arranged according to my invention.

My invention consists, first, in the formation of holes in the plate $f$ for the free passage of water from the lantern and the addition of an annular plate, $g$, to counteract the effect of the draft through the holes $f'$ and cause the greater portion of the air to pass to the center and under the burner.

$a$ is the lantern, constructed with an external frame, $a'$, which supports and retains the top $b$ and bottom $c$ correctly in position. $d$ is the globe, supported at its upper end in a ring, $b'$, and at its lower end in a ring, $c'$. The lamp $e$ in the arrangement shown in the drawings is retained in position in the lower part of the lantern by means of bayonet-joints $x$, arranged on each side of the lantern, so that by simply turning the lamp $e$ the same may be removed for cleaning, lighting, or other purposes. This means of holding the lamp $e$ in position, however, forms no part of my present invention, and other means of holding the lamp $e$ in position may be employed. $f$ is a curved dished plate, which is affixed to the burner $e^2$ and is provided with a series of small holes, $f'$, and, when the lamp $e$ is in position in the lantern, forms the bottom of the interior of the same. $g$ is an annular dished plate provided with a hole, $g^1$, in the center, of sufficient size to allow of the passage of the burner therethrough. This annular plate is provided with a series of holes, $g^2$. $h$ is an annular deflector for the purpose of conducting the external air down through the small openings $e^5$ in the ring $c'$, as shown by the arrow 1 in Fig. 2. Such air then impinges on the plate $f$, and is thereby caused, with the aid of the annular plate $g$, to take the form of a wave having a curvilinear motion, such that it shall be directed under the burner $e^2$, and upward to the flame through the center, as represented by the arrows 2. In the event of a greater wave of air passing in on one side of the lamp than can pass up through the cone $e^2$ such excess will be conducted under the burner, as shown by the arrow 3, to the opposite side of the globe, and over the burner to the flame, when it will amalgamate with the upward current from the flame, so that no part of the wave shall impinge upon the exterior of the cone $e^3$ or pass down through the burner. The series of small holes are formed in the annular ring $g$ at $g^2$ to prevent stagnation or a tendency to a vacuum near the globe, the current of air therefrom passing up, as indicated by the arrows 4.

Any water passing into the lantern through the deflector $h$ will pass away through the holes $f'$ in the plate $f$; care must, however, be taken that these holes are not sufficiently large or close together to form a current which would interfere with the current passing in through the deflector.

The upper part $b$ of the lantern I prefer to be constructed as described in my former patent, herein referred to; but other arrangements of the upper part may be employed.

It will be readily understood by persons acquainted with the manufacture of lanterns that my improvements may be readily applied to hand or other lamps for burning hydrocarbon oils in which ordinary chimneys are used in place of globes.

Having thus described my invention, what I claim, and desire to secure by Letters Patent, is—

1. The annular dished plate $g$, provided with a central hole, $g^1$, for the passage of the burner therethrough, and holes $g^2$, arranged, constructed, and operating substantially as shown and described.

2. The combination of a curved dished plate, $f$, and an annular plate, $g$, substantially as and for the purpose shown and specified.

3. In a lantern such as described, the annular plate $g$, annular deflector $h$, and perforations $e^5$, arranged in relation to a plate, $f$, and the wick-tube, substantially as set forth.

In testimony that I claim the foregoing I have hereunto set my hand this 7th day of October, 1873.

EDGAR K. HAYNES.

Witnesses:
O. F. CRANE,
A. H. SKILTON.